United States Patent [19]

Horikawa et al.

[11] Patent Number: 4,727,300
[45] Date of Patent: Feb. 23, 1988

[54] MOTOR CONTROL METHOD

[75] Inventors: Kazuo Horikawa; Yoshiaki Ishino; Takenori Tomita, all of Kanagawa, Japan

[73] Assignee: Fuji Photo Film Co., Ltd., Kanagawa, Japan

[21] Appl. No.: 744,446

[22] Filed: Jun. 13, 1985

[30] Foreign Application Priority Data

Jun. 13, 1984 [JP] Japan .................. 59-121635

[51] Int. Cl.$^4$ .............................. H02P 5/40
[52] U.S. Cl. .................. 318/326; 318/314; 318/317; 318/341; 318/327
[58] Field of Search ............ 318/311, 312, 313, 314, 318/315, 316, 317, 318, 326, 327, 328, 615, 616, 617, 618, 619, 620, 621, 628, 632, 599, 600, 601, 602, 603, 604, 606, 607, 608, 609, 341

[56] References Cited

U.S. PATENT DOCUMENTS

| | | | |
|---|---|---|---|
| 3,210,626 | 10/1965 | Wizrzbicki ..................... | 318/621 |
| 3,298,622 | 1/1967 | Raymond et al. ............. | 318/314 X |
| 3,476,335 | 11/1969 | Andeen et al. ................ | 318/621 X |
| 3,492,506 | 1/1970 | Martin et al. .................. | 318/622 X |
| 3,500,162 | 3/1970 | Dyer ................................ | 318/314 |
| 3,553,555 | 1/1971 | Morris et al. ................. | 318/314 |
| 3,582,550 | 6/1971 | Latanzi ............................ | 318/314 X |
| 3,588,007 | 6/1971 | Naumann ....................... | 318/621 X |
| 3,686,469 | 8/1972 | Clark et al. ................... | 318/603 X |
| 3,731,176 | 5/1973 | Mitchell et al. ............... | 318/619 |
| 3,753,067 | 8/1973 | Milligan ......................... | 318/341 X |
| 3,883,786 | 5/1975 | McNaughton et al. ....... | 318/317 |
| 3,950,682 | 4/1976 | Dohanich, Jr. ................ | 318/327 X |
| 3,974,428 | 8/1976 | Hafle .............................. | 318/314 |
| 4,032,826 | 6/1977 | Jahnke et al. ................ | 318/314 |
| 4,051,423 | 9/1977 | Touchton et al. ............ | 318/619 X |
| 4,203,061 | 5/1980 | Minakuchi .................... | 318/318 X |
| 4,216,419 | 8/1980 | Van Dam et al. ............ | 318/314 X |
| 4,345,194 | 8/1982 | Green ............................. | 318/621 |
| 4,368,411 | 1/1983 | Kidd ............................... | 318/341 X |
| 4,371,819 | 2/1983 | Kaufmann .................... | 318/329 X |
| 4,376,262 | 3/1983 | Okuda et al. ................. | 318/685 X |
| 4,418,307 | 11/1983 | Hoffmann et al. ........... | 318/314 X |
| 4,467,320 | 8/1984 | McPhee ......................... | 318/661 X |
| 4,486,692 | 12/1984 | Sonoda et al. ................ | 318/327 X |
| 4,570,110 | 2/1986 | Bloom et al. ................. | 318/313 |

FOREIGN PATENT DOCUMENTS 59-20014 2/1984 Japan .

Primary Examiner—William M. Shoop, Jr.
Assistant Examiner—Paul Ip
Attorney, Agent, or Firm—Sughrue, Mion, Zinn, Macpeak & Seas

[57] ABSTRACT

A signal representing the period between adjacent positive-going edges and the period between adjacent negative-going edges of a pulse train generated by a rotary encoder coupled coaxially to a motor is compared with a reference period signal for the motor to produce a deviation signal. The rotation of the motor is controlled by the deviation signal.

2 Claims, 5 Drawing Figures

Fig.3
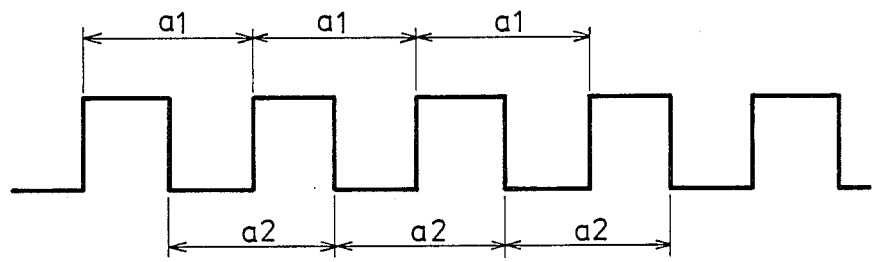
Fig.5
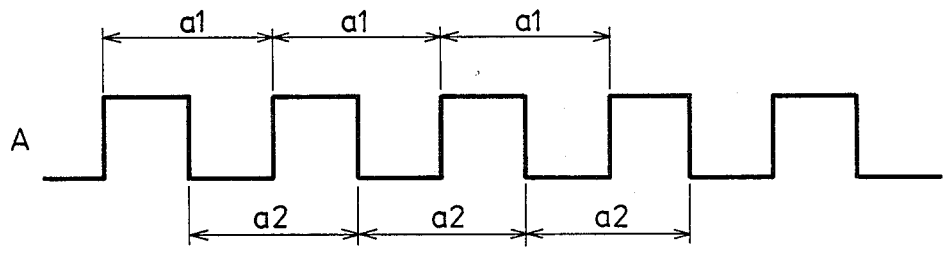
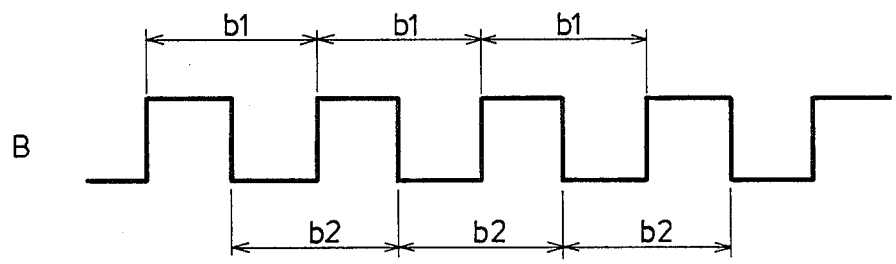

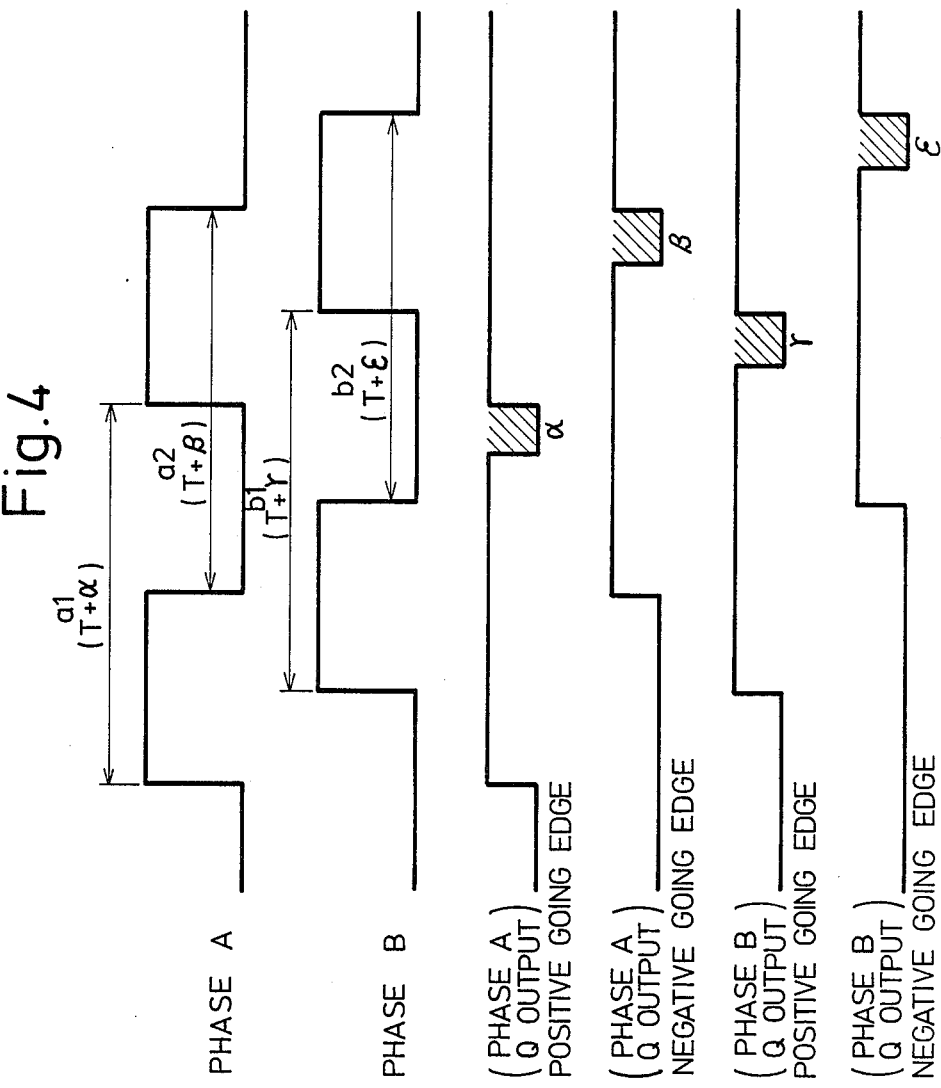

MOTOR CONTROL METHOD

BACKGROUND OF THE INVENTION

The present invention relates to a motor control method, and more particularly to a method of controlling the rotation of a motor with a deviation signal produced by comparing a reference period signal and a signal generated by a rotational speed detector coupled to the motor as it rotates at an ultra low speed, the generated signal representing the period between adjacent positive-going edges and the period between adjacent negative-going edges of a pulse train in each of a plurality of motor phases.

For performing highly accurate control in servo systems, it has widely been practiced to attach a tachometer generator to the rotating shaft of a servomotor to provide a feedback loop, feed back an output signal indicative of the voltage from the tachometer generator through the feedback loop, and compare the signal with a control reference signal for controlling the rotation of the servomotor.

The servo system for controlling the rotation of a servomotor at an ultra low speed would considerably be expensive if it incorporated a tachometer generator for producing a feedback signal. To avoid this drawback, there have been developed and used various devices in which the servomotor is associated with a relatively inexpensive rotational speed detector such as a rotary encoder, rather than the tachometer generator, to produce pulses which are counted for digital feedback control of the servomotor.

In the devices in which the servomotor is required to be driven at an ultra low speed such as 0.3 through 0.5 revolution per minute, however, the pulses produced by the rotary encoder are quite few, and it would be difficult from the standpoint of accuracy to effect feedback control with the few pulses from the rotary encoder. One solution would be to use a high-frequency rotary encoder capable of producing many pulses when the motor rotates at an ultra low speed, but such a highfrequency rotary encoder would be very expensive to manufacture.

SUMMARY OF THE INVENTION

In view of the aforesaid shortcomings of the conventional servomotor control, it is an object of the present invention to provide a motor control method which is capable of increasing the controlling accuracy by measuring the period between adjacent positive-going edges and the period between adjacent negative-going edges of a pulse train from a rotary encoder coupled coaxially to a controlled motor, even when the controlled motor rotates at an extremely low speed and hence the rotary encoder produces only few pulses.

According to the present invention, there is provided a method of controlling a motor coupled coaxially to a rotary encoder, comprising the steps of comparing a signal representing the period between adjacent positive-going edges and the period between adjacent negative-going edges of a pulse train generated by the rotary encoder with a reference period signal for the motor to produce a deviation signal, and controlling the rotation of the motor with the deviation signal.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a diagram showing the periods between adjacent positive-going edges and adjacent negative-going edges of an output pulse signal generated by a rotary encoder in the servo control system of FIG. 1;

FIG. 4 is a diagram illustrating the waveforms of signals employed for obtaining a deviation signal from the periods shown in FIG. 3; and FIG. 5 is a diagram explanatory of the periods between adjacent positive-going edges and adjacent negative-going edges of an output pulse signal generated from the phases A and B of a rotary encoder.

DESCRIPTION OF THE PREFERRED EMBODIMENT

Figure 1:
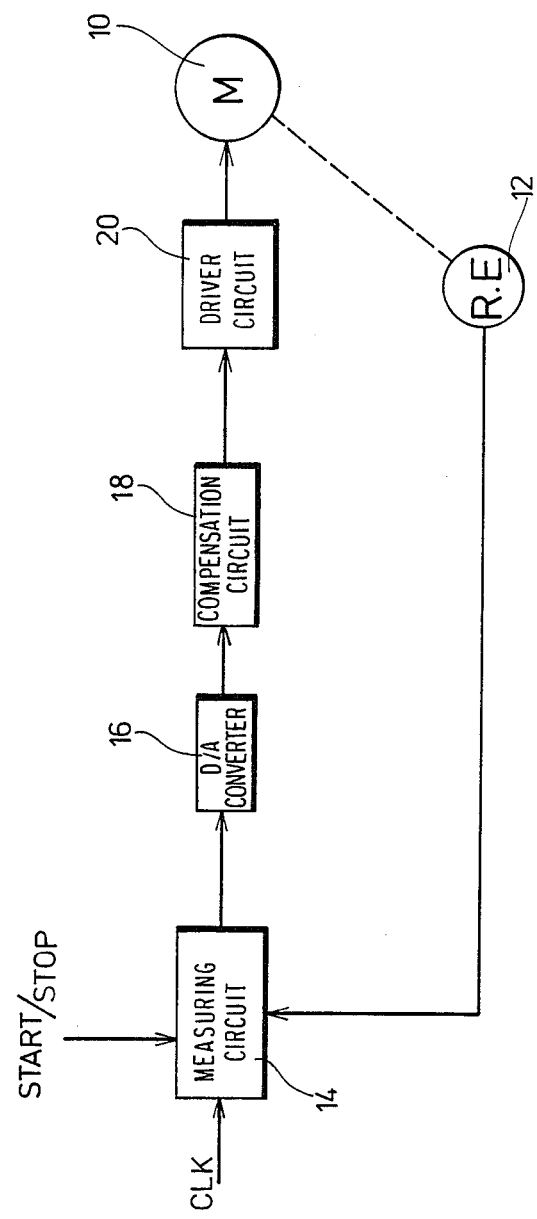
FIG. 1 is a block diagram of a servo control system in which a motor control method of the present invention is incorporated.

In FIG. 1, the reference numeral 10 designates a servomotor, and the reference numeral 12 a rotary encoder coupled coaxially to the rotating shaft of the servomotor 10. The rotary encoder 12 has an output terminal connected to a period measuring circuit 14 which is supplied with clock pulses as a reference clock signal for the servomotor 10 and a drive start/stop signal for the servomotor 10.

The period measuring circuit 14 has an output terminal connected to a D/A converter 16 with its output terminal coupled to a compensation circuit 18 which serves to compensate for a lead or a lag in phase. The compensation circuit 18 has an output terminal joined to a driver circuit 20 for the servomotor 10.

Figure 2:
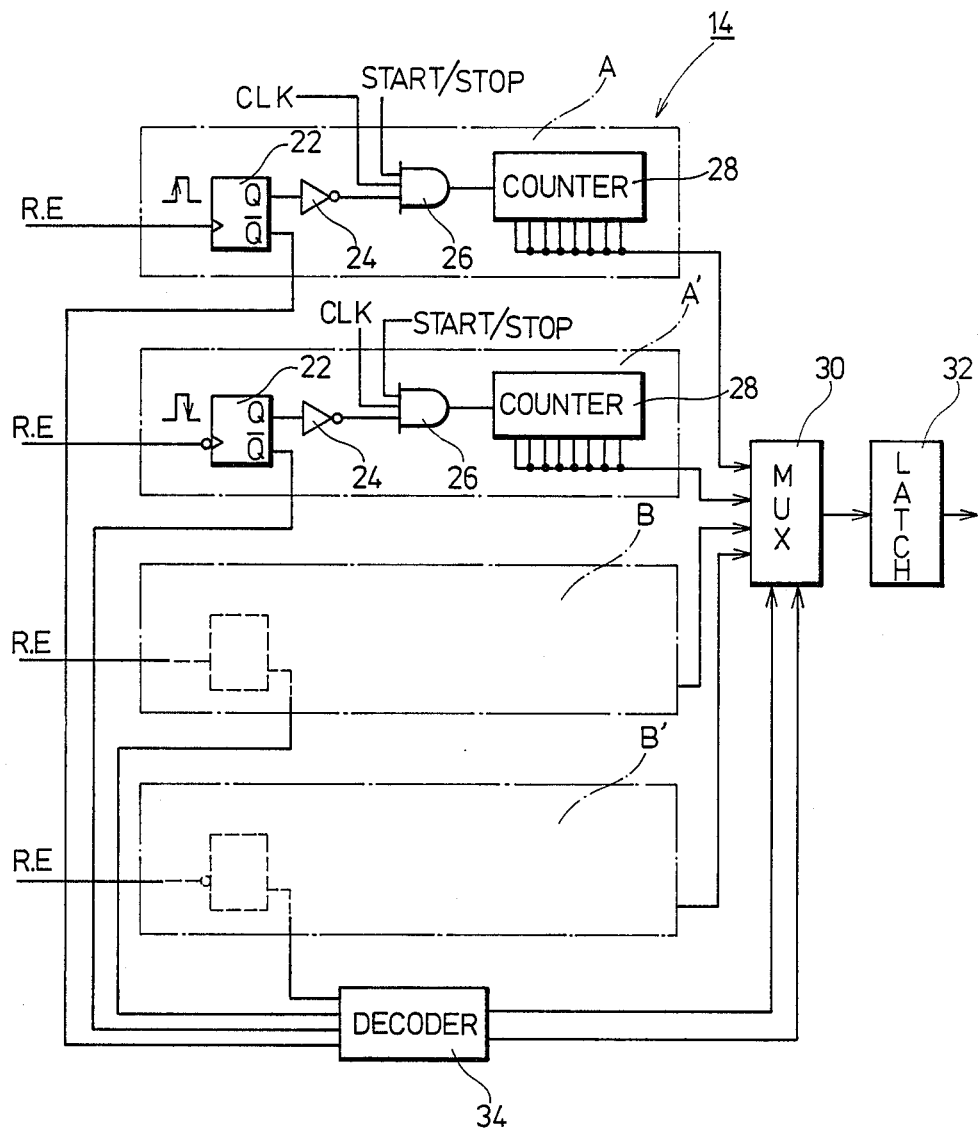
FIG. 2 is a block diagram showing the internal construction of a period measuring circuit in the servo control system shown in FIG. 1.

The internal construction of the period measuring circuit 14 is illustrated in FIG. 2.

The period measuring circuit 14 includes a circuit A for measuring the period between adjacent positive-going edges of pulses produced from a phase A of the rotary encoder 12, and a circuit A' for measuring the period between adjacent negative-going edges of pulses produced from the phase A of the rotary encoder 12. The period measuring circuit 14 may also optionally include a circuit B for measuring the period between adjacent positive-going edges of pulses produced from a phase B of the rotary encoder 12, and a circuit B' for measuring the period between adjacent negative-going edges of pulses produced from the phase B of the rotary encoder 12.

The circuits A, A', B, and B' are essentially identical in construction to each other, the only structural difference being that the circuits A and B are actuated by the positive-going edge of the pulse produced by the rotary encoder 12, whereas the circuits A', B' are actuated by the negative-going edge of the pulse produced by the rotary encoder 12. For convenience only the circuit A will be described in detail.

The circuit A is composed of a monostable multivibrator 22, an inverter 24 connected to the Q output terminal thereof, an AND gate 26 which is openable in response to the output from the inverter 24, the reference clock signal, and the drive start/stop signal for the servomotor 10, and a 8-bit counter 28 coupled to the output terminal of the AND gate 26. The counter 28 has an output terminal connected to a multiplexer 30 with its output terminal joined to a latch circuit 32. The monostable multivibrator 22 has a $\overline{Q}$ output terminal connected to a decoder 34 having output terminals coupled to the multiplexer 30.

The $\overline{Q}$ output terminals of the monostable multivibrators 22 in the other circuits A', B, B' are also connected to the decoder 34, and the output terminals of the counters 28 in the other circuits A', B, B' are also coupled to the multiplexer 30.

In response to the clock signal (CLK) supplied via a frequency divider (not shown) from a non-illustrated quartz oscillator, the servomotor 10 rotates at an ultra low speed such as 0.3 through 0.5 revolution per minute. Upon rotation of the servomotor 10, the rotary encoder 12 generates a pulse signal composed of about 60 pulses per second.

The output pulses from the rotary encoder 12 are compared with the reference period of a reference signal in the period measuring circuit 14. More specifically, the period measuring circuit 14 measures the pulses from the rotary encoder 12 for the period a1 (FIG. 3) from a positive-going edge to a following positive-going edge and the period a2 from a negative-going edge to a following negative-going edge, and compares the measured periods a1, a2 with the reference period to produce a deviation signal. Then, the deviation signal is supplied to the D/A converter 16 (FIG. 1) which converts the supplied signal to an analog signal that is applied through the compensation circuit 18 to the driver circuit 20 as a motor drive control signal.

The foregoing operation will be described in greater detail with reference to FIGS. 2 and 4.

A pulse train fed from the phase A of the rotary encoder 12 is supplied to the monostable multivibrator 22 which is energized by positive-going edges of the supplied pulse train to deliver an output signal to the inverter 24. The AND gate 26 is arranged to be opened in response to the output signal from the inverter 24, the reference clock signal CLK, and the drive start signal for the servomotor 10. Therefore, when the output signal is supplied from the Q output terminal of the monostable multivibrator 22, it is inverted by the inverter 24, and hence the AND gate 26 is closed. Upon elapse of a reference period time T determined by a constant CR, the monostable multivibrator 22 stops supplying the output signal from the Q output terminal thereof. Then, the inverted output signal from the inverter 24 opens the AND gate 26 to allow the counter 28 to start counting the clock pulses. The counter 28 keeps counting the clock pulses for a time $\alpha$ until a next positive-going edge of the pulse train from the phase A of the rotary encoder 12. The counter 28 issues the number of pulses counted in the time $\alpha$ as a deviation signal to the multiplexer 30. The output signal from the $\overline{Q}$ output terminal of the monostable multivibrator 22 is delivered to the decoder 34 which decodes the supplied signal to enable the multiplexer 30 to supply a pulse output corresponding to the time $\alpha$ to the latch circuit 32. The latch circuit 32 temporarily holds the pulse output until a next output signal is fed from the multiplexer 30, and then issues the pulse output to the D/A converter 16. The servomotor 10 is controlled by the analog output signal from the D/A converter 16.

The circuit A' is triggered by a positive-going edge of the pulse train from the rotary encoder 12. More specifically, the monostable multivibrator 22 issues an output signal from its Q output terminal to the inverter 24, which issues an inverted output signal to close the gate 26. Upon elapse of the reference period time T, the monostable multivibrator 22 enables the inverter 24 to open the AND gate 26, whereupon the counter 28 starts counting the clock pulses for a time $\beta$ until a next negative-going edge of the pulse train from the rotary encoder 12 is reached. The number of the counted clock pulses is converted to an 8-bit signal which is fed to the multiplexer 30. The 8-bit signal is issued from the multiplexer 30 to the latch circuit 32 by a signal which is supplied from the decoder 34 in response to the output signal from the $\overline{Q}$ output terminal of the monostable multivibrator 22. The latch circuit 32 supplies the latched signal to the D/A converter 16 for controlling the rotation of the servomotor 10.

While the method of the invention has been described as being combined with the rotary encoder which issues a single train of pulses, the method of the invention can be used with a rotary encoder which issues at least two pulse trains for an increased control accuracy.

Where there is employed a rotary encoder capable of producing two pulse trains from phases A and B, for example, the circuits B, B' as shown in FIG. 2 may additionally be utilized. The pulse train from the phase A is compared with the reference period in the same manner as described above. For a pulse train from the phase B, a period b1 from a positive-going edge to a following positive-going edge and a period b2 from a negative-going edge to a following negative-going edge are compared with the reference period. More specifically, the pulses after a carry output is issued are counted for a period $\gamma$ between adjacent positive-going edges of the pulse train from the phase B, and the pulses after a carry output is issued are counted for a period $\epsilon$ between adjacent negative-going edges of the pulse train from the phase B'. The counted pulses which are out of synchronism with each other are utilized as control signals for the servomotor 10. Since the four periods are compared with the reference period in this embodiment, a higher control accuracy can be achieved.

With the present invention, as described above, the conventional problem of insufficient servomotor control due to few pulses available at the time the servomotor rotates at an ultra low speed can be solved by observing the period between adjacent positive-going edges and also the period between adjacent negative-going edges of the pulse train, and comparing the periods with the reference signal. Therefore, the control resolution can be improved for various control modes with a high accuracy in controlled systems which rotate at ultra low speeds, i.e., produce few pulses.

Although a certain preferred embodiment has been shown and described, it should be understood that many changes and modifications may be made therein without departing from the scope of the appended claims.

What is claimed is:

1. A method of controlling a motor coupled coaxially to a rotary encoder, comprising the steps of:
   (a) obtaining a first signal by counting clock pulses based on adjacent positive-going edges of a pulse train generated by said rotary encoder;
   (b) obtaining a second signal by counting clock pulses based on adjacent negative-going edges of the pulse train;

(c) comparing said first signal with a reference period signal for the motor to produce a first deviation signal;
(d) comparing said second signal with the reference period signal to produce a second deviation signal; and
(e) controlling the rotation of the motor in accordance with the first and second deviation signals.

2. A method according to claim 1, wherein said reference period signal has a period shorter than the period between adjacent positive-going edges or the period between adjacent negative-going edges, said first deviation signal comprising clock pulses produced between said reference signal and the period between adjacent positive-going edges, said second deviation signal comprising clock pulses produced between said reference period signal and the period between adjacent negative-going edges.

* * * * *